United States Patent [19]

Lau

[11] Patent Number: 5,368,793
[45] Date of Patent: Nov. 29, 1994

[54] AUTOMATIC MOLDING SYSTEM

[76] Inventor: Chun P. Lau, Room 1908, Block 19, Heng Fa Chuen, Hong Kong, Hong Kong

[21] Appl. No.: 150,724

[22] Filed: Nov. 10, 1993

Related U.S. Application Data

[63] Continuation of Ser. No. 901,951, Jun. 22, 1992, abandoned.

[51] Int. Cl.⁵ .................. B29C 33/34; B29C 33/72
[52] U.S. Cl. ..................... 264/39; 264/40.1; 264/297.2; 264/297.4; 264/297.8; 264/328.11; 264/328.16
[58] Field of Search .............. 264/39, 297.1, 297.4, 264/297.5, 297.8, 328.8, 328.11, 328.16, 40.1; 425/575, 588, 261, 254, 338, 150

[56] References Cited

U.S. PATENT DOCUMENTS

| | | | |
|---|---|---|---|
| 4,128,384 | 12/1978 | Albright | 425/575 |
| 4,877,387 | 10/1989 | Fierkens et al. | 425/575 |
| 5,075,051 | 12/1991 | Ito et al. | 264/297.2 |

FOREIGN PATENT DOCUMENTS 2200865  4/1990  United Kingdom .

*Primary Examiner*—Jill L. Heitbrink
*Attorney, Agent, or Firm*—Kenneth J. Hovet

[57] ABSTRACT

A mold set is formed with upper and lower mold plates having corresponding upper and lower cover plates. The mold plates have predetermined openings which become enclosed and form mold cavities when the cover plates are placed thereover. A plurality of mold sets are stacked to form a mold unit which may be placed in a storage apparatus or into a molding cycle. The molding cycle comprises a series of automated processing steps where successive mold units are sequentially processed. the steps are performed at preheating, molding, curing, mold disassembly and mold reassembly stations. At the disassembly station, the mold units are dismantled and the individual plates may be cleaned as they are conveyed to the reassembly station. At the preheating station, new mold units may be inserted into the cycle from the storage apparatus. The stations may be physically arranged into upper and lower levels whereby gravity and simple elevator mechanisms may be used to conserve time, space and energy.

12 Claims, 3 Drawing Sheets

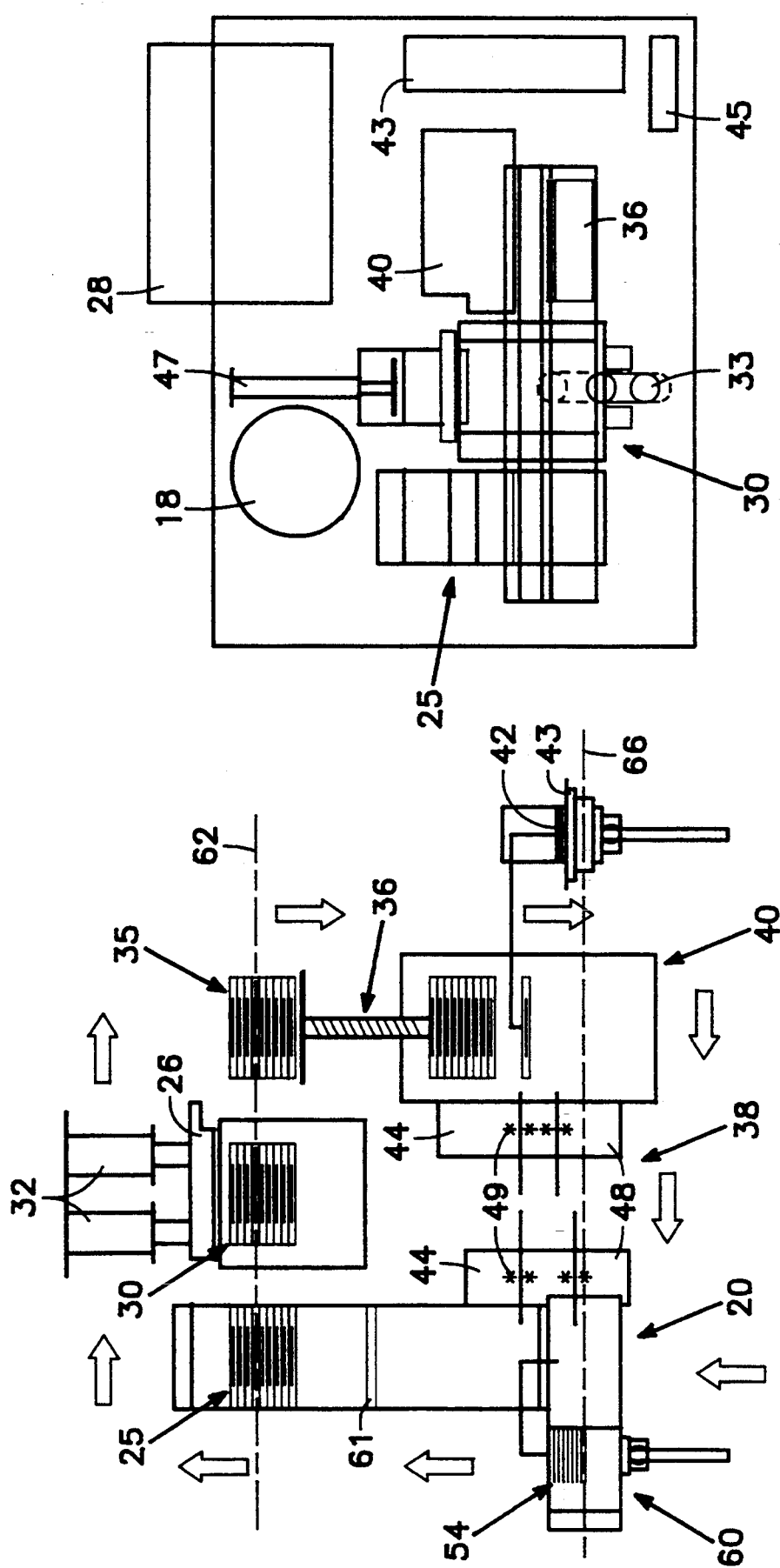

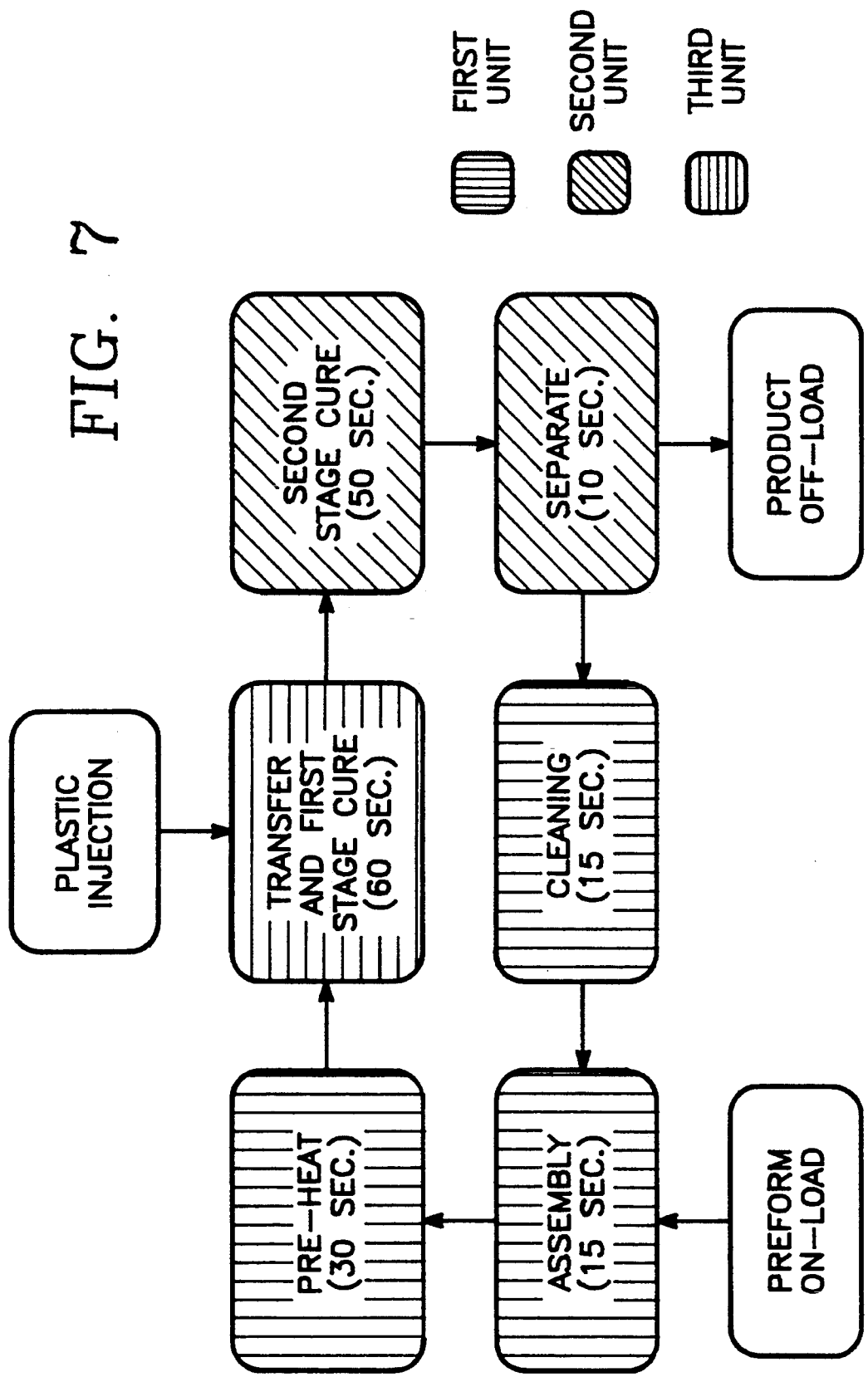

AUTOMATIC MOLDING SYSTEM

This application is a continuation of application Ser. No. 07/901,951, filed Jun. 22, 1992, abandoned.

BACKGROUND OF THE INVENTION

1. Field of the Invention

The present invention relates to an automatic molding system using multiple mold sets. More particularly, the invention concerns the circulation of successive units of stacked mold sets through a repeating molding cycle.

2. Description of Related Art

Prior art molding systems which are related to the invention have been basically controlled by hand and lever mechanisms. Such systems utilize mold cavities which are fixed in a mold container which, in turn, is fixed upon a mold base. The mold base is subsequently attached to a press. The mold cavities are usually arranged in a single layer on the press.

During the molding step, the mold cavities are clamped together in the press and they remain clamped until the injected plastic is initially set. When the press is loosened, the molds are opened and the molded products are removed by lever mechanisms. Subsequently, another group of levers reach into the molds for cleaning.

Mechanical levers are required because the molds remain fixed in the press. If the molded product incorporates a preform, a third group of levers will be needed to position the preform in the mold cavity. Thereafter, a new cycle is started.

The above described system is deficient for the following reasons:

1. Since only a single layer of mold cavities is possible, small increases in production require a large increase in press power.
2. Due to the relatively large surface area covered by the single layer molds, heat losses are excessive. As such, electrical energy requirements are extraordinarily high, not only for heating the molds, but for maintaining them at the required production temperature.
3. Because the press cannot be loosened until the plastic is cooled, the production cycle takes a longer time. Thus, fewer products can be molded per cycle.
4. Because the molds cannot be completely moved out of the press, the cleaning work is difficult. If any flashing or defective moldings become lodged in the mold, the entire mold must be removed from the press.
5. The mechanical levers are complex, difficult to maintain and very expensive to purchase.
6. Because each part of the mold must be exactly coordinated and tightly fixed on the press, it is laborious and time-consuming to change molds. As such, changes are avoided and the overall system is mostly used to produce only one kind of product.
7. Since production levels are limited by the number of mold cavities which, in turn, is limited by area constraints due to the single layer format, only a limited number of products can be produced per cycle.
8. The overall prior art system is cumbersome, heavy, complex and difficult to maintain. It is not readily adaptable to effective automation.

SUMMARY OF THE INVENTION

The present system is well suited for automation and can be easily rearranged for different products. It utilizes two or more units comprising a predetermined number of mold sets arranged into a block-like unit. The units are vertically arranged for easy conveyance through a series of production stations. Additionally, the stations are arranged to maximize use of the mold while permitting quick direct transport of the mold units to each of the processing stations.

If it is desired to produce a different product, it is easy for the system to accomplish this during an ongoing production cycle. The technique is as follows: The multiple mold sets are positioned in carriage magazines. The magazines are movable by transport means between a turret-like storage apparatus and a preheating station. Existing mold units in the preheating station are moved into empty carriage magazines and the transport means are used to move them to the storage apparatus. The transport means then operates to pick and transport the desired molding unit within its carriage magazine to the preheating station where it is moved into the preheating chamber and incorporated into the cycle.

BRIEF DESCRIPTION OF THE DRAWINGS

FIG. 1 is a schematic front elevational view of an embodiment of the new molding system of the present invention.

FIG. 2 is a schematic plan view of the system of FIG. 1.

FIG. 7 is a process flow chart relating to the illustrative embodiment shown in FIGS. 1–6.

DESCRIPTION OF THE PREFERRED EMBODIMENTS

Figure 4:
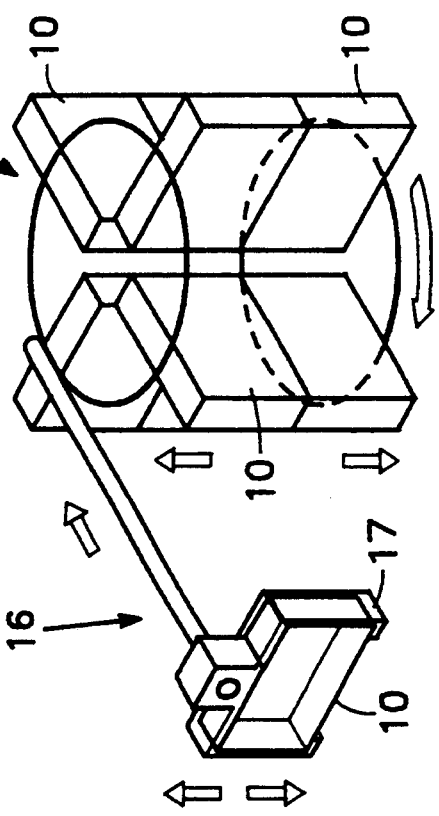
FIG. 4 is a schematic perspective view of a mold storage apparatus and transport means which is used in accordance with the illustrative embodiment referenced in FIGS. 1 and 2.

With reference now to the drawings, the mold assembly steps and an overall production cycle will be described. In accordance with the invention, a predetermined number of mold sets 12 are placed upon each other to form an upright column resembling a block. The specific number of sets will be dictated by the physical character of the mold parts, plastic injection parameters and mold press design constraints. The sets 12 include the appropriate cavities and flow channels for communicating with a common source of flowable plastic material in a manner known in the art. An exemplary mold unit with multiple mold sets is described in U.K. Patent No. 2200865 which is herein incorporated by reference.

Upon completion of the mold assembly step at assembly station 20, the mold unit is moved to a preheating station 25. After reaching the desired preheat temperature and upon actuation by the control means 45, a sliding means 26 moves the mold unit to the molding station 30.

At the molding station, press clamping mechanisms secure the mold unit in position to receive the fluent plastic material through a runner plate and the aforementioned flow channels. After an initial plastic setting period, the clamping mechanisms are loosened and the sliding means moves the mold unit to a curing station 35.

Final curing/cooling occurs during a proscribed period at the curing station and then the unit is transferred to a disassembly station 40. At this station, the mold sets are opened and the molded products 42 are removed. The separated mold parts are conveyed to the assembly station for reuse in a new cycle.

Depending on the type of mold parts being utilized, the invention comprehends the use of a cleaning station 38. The purpose of the cleaning station is to remove any unwanted plastic material that may adhere to the mold parts.

To effectively operate the above described system automatically through each molding cycle, a control system 45 is used. The control system incorporates the appropriate electronic circuitry with timers, actuators and other means known in the art to sequentially actuate, in a coordinated manner, each of the stations and associated mechanisms and each of the conveyance means.

With reference to FIG. 7, a flow chart for circulating three mold units having a sixty second mold station residence time is illustrated. This control sequence is appropriate for encapsulating portions of an integrated circuit board utilizing a multiple plate mold assembly as above described.

Figure 3:
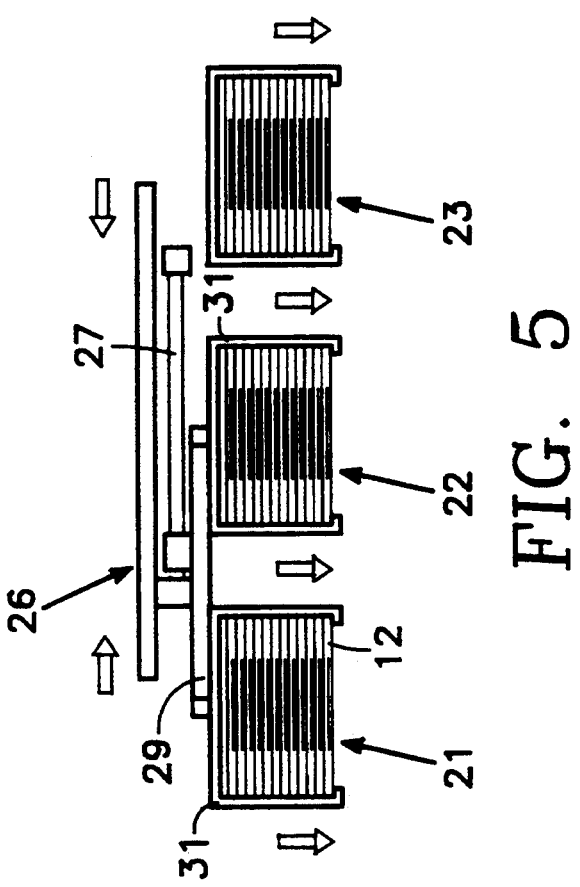
FIG. 3 is an exploded perspective view of a mold set which used with the illustrative embodiment of FIGS. 1 and 2.

As best seen in FIG. 3, each mold set comprises identical upper and lower rectangular slab-like molding plates 50,51 with each plate having six corresponding openings 52 forming one-half of a mold cavity. A preform comprising a printed circuit board 54 with six predetermined areas 55 for encapsulation is sandwiched between the molding plates with the aforesaid areas positioned within the cavity formed by the corresponding upper and lower mold plate openings.

Upper and lower cover plates 58,59 are used to close the mold plate openings and form a closed mold cavity about each of the six circuit board areas. As described in the U.K. Patent, the mold plates include the necessary channels for flowing plastic from a plastic injection source 28 to each of the cavities.

Because the four molding plates comprise flat rectangular plates of identical outline, it is possible to arrange them into a uniform stable vertical stack. In the present example, twelve mold sets are used to form a mold unit of seventy-two cavities.

Three mold units, as formulated above, are placed in a respective carriage magazine 17 which is then positioned in a mold storage apparatus 18. Spare mold units and different sizes and types of mold sets may also be located at the storage apparatus. The apparatus is adjacent to the preheating station 25 for convenient integration of the mold units into the molding cycle.

To begin the cycle, the control system 45 is loaded with instructions for producing the specified encapsulated circuit boards with the above-described three mold units and the desired plastic material. Heaters are started at the preheating and molding stations. The plastic supply and injection systems are also heated to the desired temperatures. It is assumed that the three mold units have already been integrated into the system.

A first mold unit 21 is lifted from the assembly station 20 to the preheating station 25. It is held there for thirty seconds at a preset temperature. Then it is moved by sliding means to the molding station 30.

The sliding means comprises a slide bar 27 upon which a yolk 29 reciprocates. Attached to each end of the yolk is a mold unit carriage frame 31. The frame engages two mold units and moves a pair of units in unison from the preheating and molding stations to the molding and curing stations. Upon actuation, a rotating helix means 36 will lower the cured units to the disassembly station 40.

Figure 6:
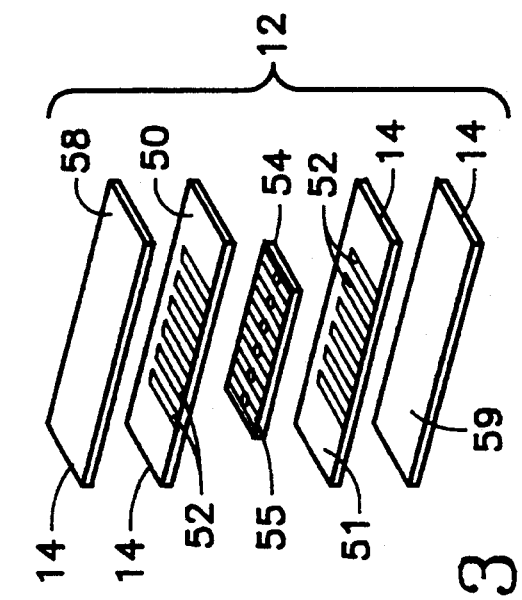
FIG. 6 is a schematic side elevational view of the molding station used in accordance with the embodiment referenced in FIGS. 1 and 2.
Figure 5:
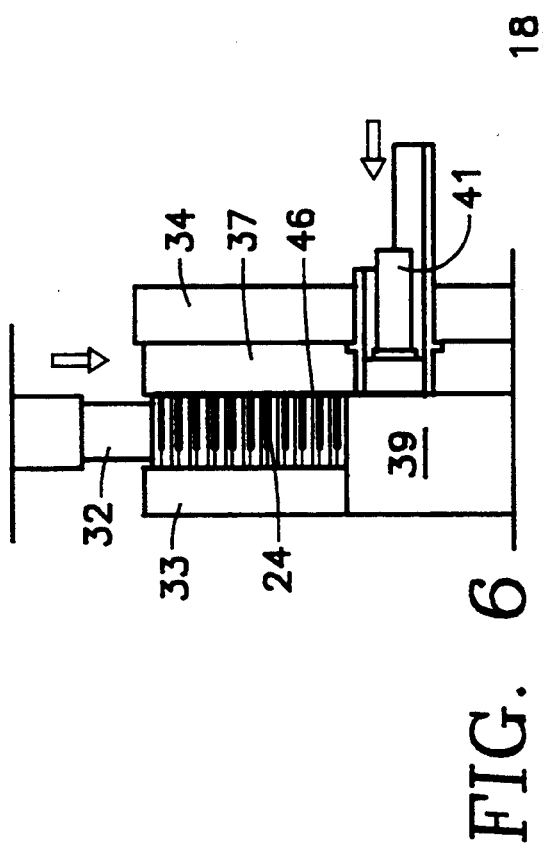
FIG. 5 is a schematic side elevational view of a sliding means which is used in accordance with the embodiment referenced in FIGS. 1 and 2.

At the molding station, press mechanisms 32 align and constrain the mold unit for injection of fluent plastic at a predetermined elevated temperature and pressure. As shown in FIG. 6, main clamp 32, side clamp 33, vertical base 34 and runner plate 37 forth a mold unit constraining area for permitting the molding step to be carried out. Since the injection step is conducted at very high pressures, a strong underlying press plate 39 is used to support the unit against force from the main clamp.

The above press mechanisms are adapted to move quickly for allowing the mold units to enter and leave the constraining area automatically without obstruction. During the molding step, fluent plastic from injection supply chamber 41 is injected into channels 46 of runner plate 37 which distributes the plastic into adjoining flow channels of each mold set to completely fill each of the cavities 24. A transfer plunger 47 supplies the chamber 41 with preheated plastic from the plastic supply tank 28.

Injecting the plastic into all 72 cavities takes about twenty seconds. However, the temperature and pressure are maintained for an additional forty seconds to insure complete mold filling and to initially set the plastic. Thereafter, the press clamping mechanisms are loosened and the mold unit is moved to the curing station 35 by the aforementioned sliding means. At the curing station, the unit is cooled down for a fifty second period and then moved by the helix means to a disassembly station 40 at lower level 66.

At the disassembly station, the mold sets are opened by separation means (not shogun). The encapsulated circuit boards 42 are removed from the separated mold sets and placed into off-load magazines 43. This process takes ten seconds.

After separation, the mold plates are conveyed to a cleaning station 38 where the plates pass through cleaning means 44. The cleaning means includes housings 48 from which air is withdrawn along with entrained plastic residue. The residue and other unwanted matter are dislodged as the plates pass between rotating brushes 49 within the housings. This process also takes ten seconds.

After the mold plates have been cleaned, they are reassembled at assembly station 20 with new circuit board preforms 54. As the upper and lower plates exit respective upper and lower cleaning areas, prefrom transfer means 60 on-loads the preforms from an adjacent stack. The transfer means inserts the preform between the upper and lower plates. The combined assembly is then added to a stack of mold sets which are elevated by lift means 61 to the preheating station 25 to begin a new cycle. This process takes fifteen seconds.

When all three molding units are circulating through the system as above described, one complete production cycle will take sixty seconds. With 72 cavities per mold unit, 4320 molded products will be produced per hour. Comparable prior art systems have a 180 second cycle and only produce 1440 products per hour.

A significant advantage of the invention is the coextensive upper level 62 arrangement of the preheating, molding and curing stations. This allows quick direct horizontal movement of the mold units by a simple carriage slide device. This is contrasted to the extra equipment that otherwise would be required to lift, move and lower the mold units to less accessible prior art stations.

The above layout also allows the mold units to be out and away from the mold. This enables the molding time to be conserved and the mold to be used only for actual molding.

Also, the disassembly and assembly stations are at a level below the preheating, molding and curing stations. As such, space is conserved and the number and extent of mold movement mechanisms is substantially reduced. The above arrangement results in quicker molding cycles.

A further advantage is the use of the carriage magazines 17 for transporting the mold units. This facilitates quick handling and movement into and out of the mold storage apparatus and preheating station.

While the invention has been described with respect to a preferred embodiment, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A molding process comprising the sequential steps of:
   1) assembling mold plates into multiple mold units at an assembly station, each mold unit comprising a plurality of mold sets arranged in a stack with each set comprising upper and lower plates juxtaposed to form predetermined flow channels and a predetermined mold cavity for communication with a moldable material;
   2) locating additional mold units at a storage apparatus;
   3) moving a first mold unit from either said assembly station or said storage apparatus to a preheating station;
   4) preheating said first mold unit for a predetermined time;
   5) moving said first mold unit from said preheating station to a molding station;
   6) flowing moldable material into said first mold unit;
   7) moving said first mold unit to a curing station and curing the molded material for a predetermined time;
   8) moving said first mold unit to a disassembly station;
   9) dismantling said first mold unit into first mold plates and removing molded products from said first mold plates;
   10) moving said first mold plates to said assembly station for reassembly;
   10a) during step 10, cleaning said first mold plates while said plates are moving;
   11) after step 5, transport a second mold unit from either said assembly station or said storage apparatus to said preheating station; and,
   12) preheat said second mold unit for a predetermined time and move said second unit successively through steps 5 through 10a in a manner equivalent to said first mold unit.

2. The molding process of claim 1 including the step of positioning a perform between said plates during the assembly of a mold set.

3. The molding process of claim 1 wherein at least said preheating, molding and curing stations are coextensively located at an upper level wherein said mold units are moved from station to station by sliding means.

4. The molding process of claim 3 wherein said assembly and disassembly stations are located below said upper level.

5. The molding process of claim 1 wherein activation and timing of each of steps 1–12 are controlled automatically by a central control means.

6. The molding process of claim 1 including:
   after step 11, transporting a third mold unit to said preheating station; and,
   preheating said third mold unit for a predetermined time and moving said third unit successively through steps 5 through 10.

7. The molding process of claim 1 wherein said storage apparatus is positioned adjacent said preheating station.

8. The molding process of claim 7 including a transport means having a carriage magazine for moving a mold unit between said storage apparatus and said preheating station.

9. An automatic mold unit recycling process electronically controlled by a control means with multiple stations operating in sequence, said stations comprising a preheating station, a molding station, a curing station, a disassembly station and an assembly station; said process beginning with two or more mold units of a vertical stack of a plurality of mold sets, each set comprising upper and lower plates juxtaposed to form predetermined flow channels and a predetermined mold cavity, said process comprising the steps of:
   successively moving each of said mold units in a timed sequence from said preheating station to said molding station, then to said curing station and then to said disassembly station;
   dismantling said mold units into individual mold plates at said disassembly station;
   transporting said plates to an assembly station;
   reassembling said plates into a mold unit at said assembly station;
   moving said mold unit to said preheating station;
   wherein said automatic molding process further includes the steps of:
   providing a mold unit storage apparatus adjacent said preheating station;
   locating additional mold units in said storage apparatus;
   providing a transport means interconnecting said mold unit storage apparatus and said preheating station for moving mold units therebetween; and,
   upon demand from said control means, transporting a selected mold unit between said mold unit storage apparatus and said preheating station.

10. The recycling process of claim 9 wherein said locating step includes the initial step of positioning said additional mold units within respective carrier magazines and then locating said magazines containing said additional mold units in said storage apparatus.

11. The recycling process of claim 9 wherein at least said preheating, molding and curing stations are coextensively located at an upper level and wherein the step of successively moving said mold units is carried-out by sliding said mold units between said preheating, molding and curing stations.

12. The recycling process of claim 11 wherein said assembly and disassembly stations are located below said upper level including the step of vertically lowering said mold unit from said curing station to said disassembly station.

* * * * *